April 14, 1953      H. A. QUIST      2,634,612
LIQUID LEVEL INDICATOR

Filed Nov. 19, 1947      2 SHEETS—SHEET 1

INVENTOR.
Harold A. Quist
BY
Busser and Harding
Attorneys

April 14, 1953 H. A. QUIST 2,634,612
LIQUID LEVEL INDICATOR
Filed Nov. 19, 1947 2 SHEETS—SHEET 2
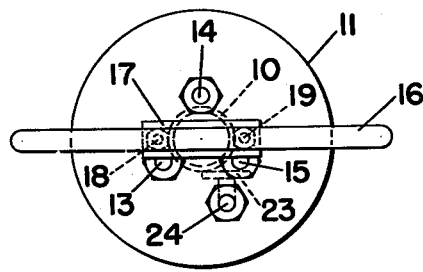
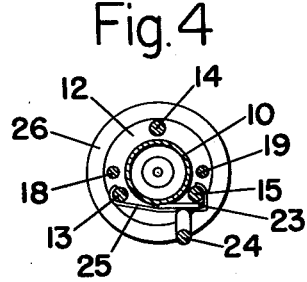
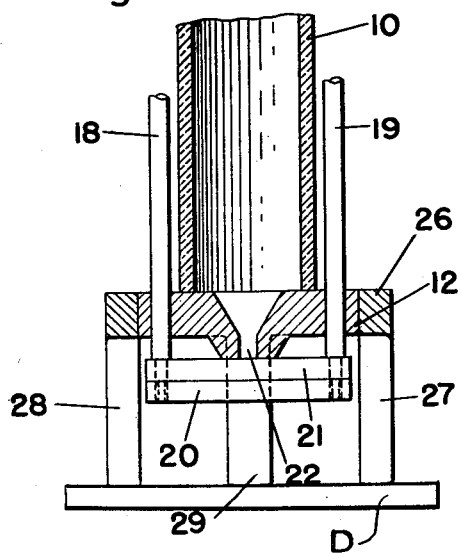
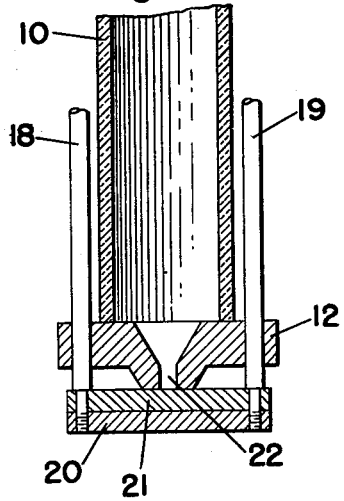
*INVENTOR.*
Harold A. Quist
BY
*Busser and Harding*
Attorneys Patented Apr. 14, 1953

2,634,612

UNITED STATES PATENT OFFICE 2,634,612

LIQUID LEVEL INDICATOR

Harold A. Quist, Elkton, Md., assignor to Sun Oil Company, Philadelphia, Pa., a corporation of New Jersey Application November 19, 1947, Serial No. 786,911

4 Claims. (Cl. 73—425.4)

This invention relates generally to new and useful improvements in liquid level indicators and particularly to that class of measuring devices used in the determination of the quantity of liquid in storage tanks by measuring the elevation of the liquid with reference to a datum point. The two forms illustrated are especially applicable to the devices shown and claimed in patent application, Serial No. 782,533, now Patent No. 2,585,680, and patent application, Serial No. 782,534, now Patent No. 2,587,525, filed currently herewith.

The primary object of this disclosure is to provide a transparent measuring device whereby the exact level of liquid in a tank with reference to a datum may be easily and readily determined. A further object of the invention is to disclose a liquid level indicator with a positive acting valve member automatically controlled by the operation of obtaining the liquid sample. Together with the foregoing stated objects, other objects will become evident in the following specification and the accompanying drawings wherein:

Figure 3 is a plan view of either Figures 1 or 2,

Figure 4 is a cross-section on line 4—4 of Figure 1,

Figure 5 is a partly broken away view of the valve member of Figure 1,

Figure 6 is a partly broken away view of the valve member of Figure 2.

Figure 1:
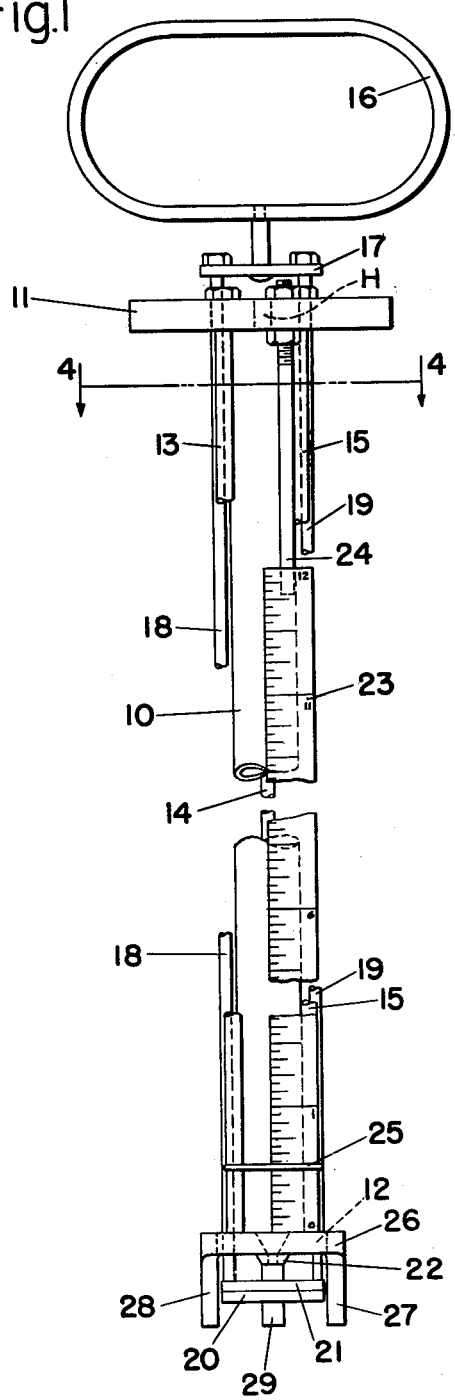
Figure 1 is an elevation partly in section of one form of this invention.
Figure 2:
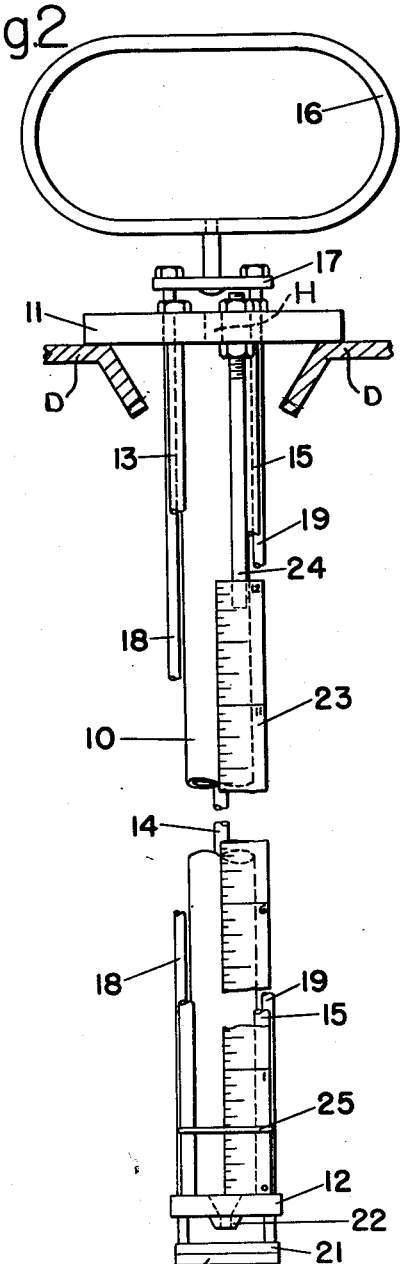
Figure 2 is an elevation partly in section of another form.

Referring to the drawings for a more specific description of the invention, and in which drawings like parts are designated by like reference characters throughout the several views, the two preferred embodiments of the device are illustrated in Figures 1 and 2 with the remaining Figures 3, 4, 5 and 6 supplying the details for a complete understanding of the device. The two preferred forms illustrated operate exactly alike but have provisions exterior of the device to permit them to be used in two different ways as is fully explained in the two above referred to application serial numbers which utilize these embodiments.

Figure 1 shows a liquid level indicator which is adapted to rest on a datum surface submerged below the level of a liquid of which the elevation is sought. Figure 2 illustrates an embodiment of the same device which is adapted to be suspended below a datum as distinguished from resting thereon as in Figure 1. The slight modification which is required to adapt this device to these two conditions will be more clearly understood after the discussion of the details of each of these devices.

Referring to both Figures 1 and 2, glass tube 10 is mounted between upper cap 11, vented by hole H, and lower cap 12 and is retained in place by these caps which, in turn, are secured by three rods 13, 14 and 15. A handle 16 is attached to a yoke 17 which is coupled to valve member 20 by sliding rods 18 and 19. The top of valve member 20 is faced with a gasket 21 which forms a seal for the opening 22 when the valve member is closed. A scale 23 is mounted on the glass tube 10 and is held in position against the glass tube by bent rod 24 and brass wire clips 25.

Figure 3 shows a plan view of the liquid level indicator which is common to both Figures 1 and 2. The same characters designate like parts in this view as have already been detailed in the first two figures. It is this view which will be presented to the operator when he is using this liquid level gauge to measure liquid elevations.

Figure 4 is a cross-section of Figure 1 on line 4—4 and is typical, with the exception of the slight variation in the bases which surround the valve member, for both Figures 1 and 2. Like parts have been designated with like characters in this view so that it may be readily fitted into a proper understanding of the device.

Figures 5 and 6 are enlarged, partially broken away sections of the valve member and show the principal distinguishing feature between Figures 1 and 2 which will be clearer after considering a description of the operation which is included later herein. Figure 5 pertains to the valve member shown in smaller scale in Figure 1 while Figure 6 is the same view of the valve member in Figure 2.

Figure 5 shows glass tube 10 projecting downwardly to fit into lower cap 12 with a liquid-tight joint. The supporting rods which maintain the measuring device as a unit, namely rods 13, 14 and 15 shown in the other views, are omitted from this view for clarity. Valve operating rods 18 and 19 are shown projecting through lower cap 12 and fastened in valve member 20. A pedestal on which this device can rest is formed by ring 26 having legs 27, 28 and 29 equally spaced about valve member 20 and forming an addition to the lower cap 12. The supporting legs on this pedestal need be long enough only to permit free movement of valve member 20 relative to aperture 22.

Reference to Figure 6 shows a valve member in preferred form which is not surrounded by a pedestal structure such as that just described for Figure 5 but retains all the other features which have been so far described. This modification of the valve will be clearly understood after a reading of the operation of the measuring device as illustrated by Figure 2.

The details of the two preferred forms of liquid level indicators will be understood from the description of the component parts as shown in Figures 1 to 6 inclusive. Reference will now be made to Figures 1 and 2 for an understanding of the operation of these two forms of measuring devices. In both instances the device is automatically brought into operation by releasing handle 16 by which it is normally transported and suspended. The operation of the device is concluded by pulling this handle upward, thereby closing the valve member and retaining within the glass tube such liquid as has entered through the valve aperture 22.

Now referring specifically to Figure 1, this form of liquid level indicator is preferred where it is required to measure the depth of liquid above a surface on which the pedestal, as represented by legs 27, 28 and 29 can rest. Such a device in which this embodiment is successfully used is illustrated by patent application Serial No. 782,533 which is filed concurrently herewith. Under such conditions as outlined therein, the liquid level indicator is lowered into a tank by means of a tape or line attached to handle 16. The weight of the glass tube 10, upper and lower caps 11 and 12, and the other metal parts which secure the tube in alignment, causes the tube to slide downward on rods 18 and 19 which are fastened to yoke 17 and handle 16 causing the gasket 21 on the upper surface of valve member 20 to close securely against aperture 22. Thus, by gravity, the valve member is closed and will not open until the weight of the glass tube and its component parts is lifted on the valve suspending rods 18 and 19. This occurs when the pedestal, as shown by legs 27, 28 and 29, comes to rest on a surface as the datum D (Figure 5). The weight of the glass tube and its component parts now being supported by the pedestal permits the valve member 20 to drop upon further release of the suspending line which is secured to handle 16 and, thereby, opens aperture 22 to inflowing liquid. The air in the glass tube escapes through vent hole H in cap 11. It is apparent that the flat surface on which the level indicator rests must be sufficiently close to the surface of the liquid being measured so that the entire device is not submerged which would then give no reading at all. Reference is again made to patent application Serial No. 782,533 which provides such a surface to properly support this device.

Figure 2 illustrates a second form of liquid level indicator which is preferred for the measurement of liquid elevations with reference to a datum D below which the device is free to suspend. As noted in the explanation of Figure 1, the liquid level indicator is attached by a line or tape fastened to handle 16 and is lowered into the body of liquid to be measured. During the downward progress, the valve member gasket 21 is tightly held against aperture 22 by weight of the glass tube 10 and its various component parts sliding downward on rods 18 and 19. This part of the operation has been explained above and is identical with this form of the measuring device. Whereas the weight of the glass tube and its component parts were relieved by the pedestal coming to rest on a surface in Figure 1, in this case Figure 2, having no such arrangement, is designed to rest the upper cap 11 against a funnellike receptacle, the periphery of a hole slightly smaller than the diameter of the upper cap, or any other means whereby the datum might be indicated. Having come to rest on this reference elevation and the upper cap 11 resting firmly on the supporting device, the weight of the glass tube and its component parts will be assumed by the datum and continued lowering of handle 16 will cause valve member 20 to open by gravity. With the opening of the valve, aperture 22 is free to accept the liquid into glass tube 10, the air in the tube escaping through the vent hole H in cap 11. The datum, having been determined so that the liquid level indicator is capable of measuring the depth of the liquid as is provided in our patent application, Serial No. 782,534, filed currently herewith, the liquid will rise to a height within the glass tube which is measurable by scale 23. The fluid, having ceased to rise, a pull on the line which is fastened to handle 16 will lift the valve member 20, close the aperture 22 and maintain the liquid at the proper level in the tube. Further lifting on the attached line will raise the indicating device so that the upper cap 11 is lifted free of the supporting datum and keep the device closed again leakage. The level of the liquid in the glass tube is thus a measure of the liquid elevation with reference to the datum which supported the device and is retained until read by the operator and released prior to reuse.

The above specification describes in detail the component parts and operation of two forms of a liquid level indicator which operate identically. Various modifications of this basic structure are readily suggested such as changes in the pedestal form which supports the preferred embodiment of Figure 1, or relocations of the suspending means shown as upper cap 11 to various parts of the tubular body. It is not intended to encumber this specification with all the modifications of which this device is capable, but merely to illustrate these two preferred embodiments of the idea which are referred to as forming part of the operating mechanisms of two patent applications which have been filed concurrently.

I claim:

1. A liquid depth measuring device adapted to cooperate with a datum which prevents total submergence in the liquid, said device comprising two main elements, one comprising a transparent tube having an opening through which liquid is adapted to flow into the lower end of the tube, and the other comprising a frame, a handle carrying said frame and a valve member carried by the frame and located below said opening; the first element being freely vertically slidable on the second element so that when the second element is lifted by the handle the first element will drop by gravity and contact said valve member to close said opening and retain it closed while the device is being lowered into the body of liquid, and means carried by the first element adapted, when arrested in its downward movement, to be lifted relatively to the second element to thereby retract said opening from the valve member and allow entry of liquid into the tube, the subsequent lifting of the second element by the handle allowing the first element to again drop by gravity to close said opening.

2. A liquid depth measuring device adapted to cooperate with a datum which prevents total submergence of said device and which comprises: a supporting frame, a valve member carried thereby and hand-operable means for raising and lowering said frame, a transparent liquid-receiving tube arranged to slide axially along the supporting frame and to rest in sealing engagement with the valve member during the lowering of the frame and while the frame is being raised, and means movable with said tube adapted to engage a datum and arrest the downward movement of the tube while continued downward movement of said frame unseats said valve member to allow admission of liquid to the tube.

3. The device defined in claim 2 in which said means comprises a frame the lower part of which extends below said tube and said valve member and is adapted to engage a datum.

4. The device defined in claim 2 in which said means comprises a frame extending along said tube and having at its upper end a member adapted in the downward movement of the first named frame to engage a datum.

HAROLD A. QUIST.

References Cited in the file of this patent

UNITED STATES PATENTS

| Number | Name | Date |
|---|---|---|
| 152,971 | Conklin | July 14, 1874 |
| 1,296,794 | Haggstrom | Mar. 11, 1919 |
| 1,938,079 | Maras et al. | Dec. 5, 1933 |
| 2,255,369 | Spaeth | Sept. 9, 1941 |
| 2,302,884 | O'Neill | Nov. 24, 1942 |

FOREIGN PATENTS

| Number | Country | Date |
|---|---|---|
| 435,639 | Germany | Oct. 18, 1926 |
| 594,332 | Germany | Mar. 15, 1934 |